Jan. 3, 1939. T. R. BARNETT 2,142,298
GARDEN TOOL
Filed Oct. 30, 1937 2 Sheets-Sheet 2
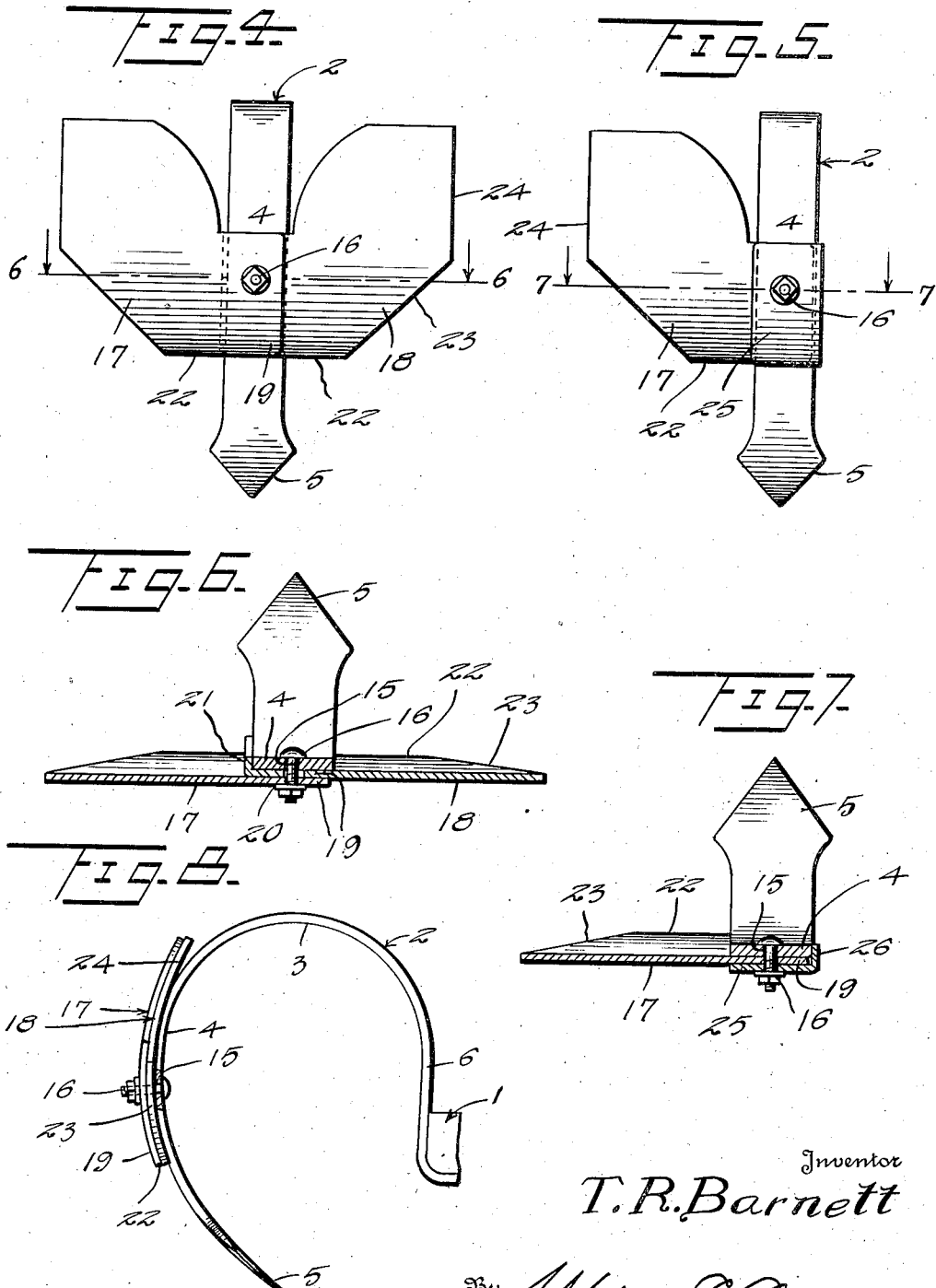

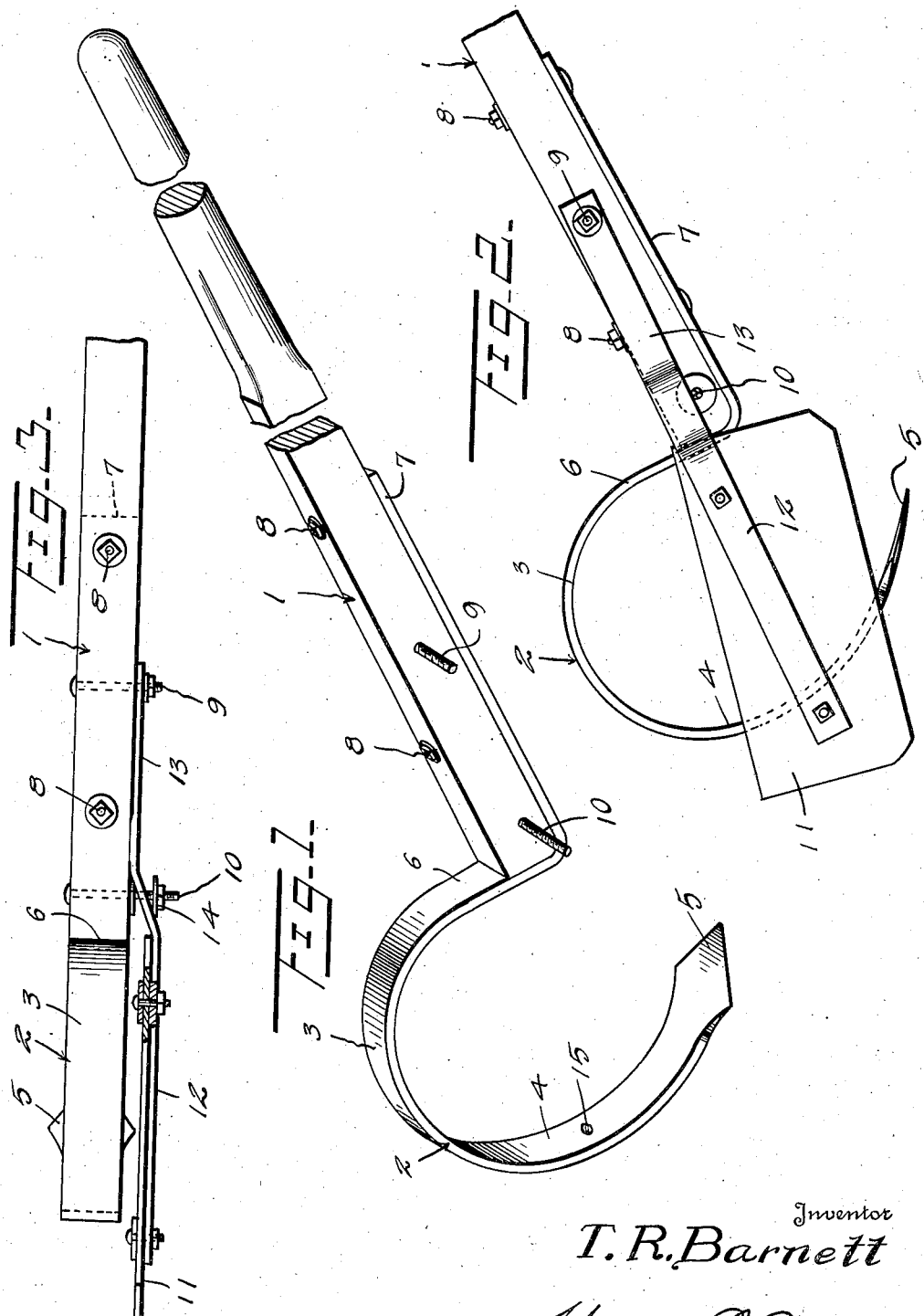

Patented Jan. 3, 1939

2,142,298

UNITED STATES PATENT OFFICE 2,142,298

GARDEN TOOL

Thomas R. Barnett, Atlanta, Ga.

Application October 30, 1937, Serial No. 172,016

2 Claims. (Cl. 97—61)

This invention relates to the class of agricultural implements and pertains particularly to a hand-operated implement of the nature of a plow.

The present invention has for a primary object to provide an improved hand-operated earth-working implement which may be employed for the purpose of plowing the earth easily and without imposing undue strain upon the user or subjecting him to jars or vibrations which are incident to the use of other hand-operated plowing instruments.

Another object of the invention is to provide a hand-operated earth working implement which may be employed for performing a number of jobs in connection with the preparation of the earth for planting seeds and in which the main unit of the implement, which may be used by itself for plowing operations, is in the form of an oval resilient frame having a handle attached to one side thereof and having a plow-like point at its opposite side which, when in use, will work smoothly through the ground and will absorb vibrations or shocks occurring during the use of the device so that such shocks or vibrations will not be imparted to the hands and arms of the user.

Still another object of the invention is to provide a hand-operated plow having means associated therewith for the attachment thereto of additional earth-working units whereby furrow-forming and hoeing operations may be conveniently employed and whereby earth may be worked in close proximity to and between growing plants without danger of injuring same.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in perspective of the earth-working implement embodying the present invention as it is intended to be used for plowing alone.

Fig. 2 is a view in side elevation of the implement showing the fender or guard unit attached whereby the implement may be employed for working the earth in close proximity to plants.

Fig. 3 is a view in top plan of the implement as shown in Fig. 2.

Fig. 4 is a view looking at the front of the implement showing the same equipped with the furrow-forming wing blades.

Fig. 5 is a view similar to Fig. 4 showing the manner of using one wing blade only.

Fig. 6 is a section taken on the line 6—6 of Fig. 4.

Fig. 7 is a section taken on the line 7—7 of Fig. 5.

Fig. 8 is a view in side elevation of the implement when equipped with the pair of blades shown in Fig. 4.

Referring now more particularly to the drawings, the numeral 1 generally designates the handle of the implement, to the forward end of which is attached the plowing unit, which is indicated generally by the numeral 2, and to which the other parts of the implement are attached for use.

The unit 2 is constructed of spring steel of substantial width and is formed or bent into a frame of substantially oval outline which frame is open at its apex portion, as illustrated. The frame when in use is disposed with the arcuate portion 3 forming the top and the forward side which is indicated by the numeral 4, curves downwardly and rearwardly to the broad sharpened plowpoint 5. It is preferred that the frame be so formed that the tip or point 5 be disposed in a plane passing substantially midway between the front side 4 and the rear side 6 of the frame so that the implement when in use will function with the greatest efficiency.

The rear of the frame which is indicated by the numeral 6, terminates in the relatively long arm 7 which is disposed substantially at right angles to the center line of the frame and between the transverse or horizontal center thereof and the point of the blade 5. This arm extends rearwardly and is disposed against the lower side of the handle 1 to which it is secured by bolts 8.

The forward end of the handle 1 abuts the rear face of the rear portion 6 of the frame, as illustrated in Figs. 1 and 2, so that these two units will be firmly secured together and thus when the point of the blade 5 is pressed into the ground and the blade is pulled or dragged through the ground there will be no vibration or shock transmitted from the frame to the handle.

The handle 1 carries adjacent its forward end the two bolts 9 and 10 which extend transversely therethrough and project from the left side of the handle as shown in Fig. 1. These bolts are provided for the support of a guard or fender blade 11, which blade is of elongated rectangular outline, as illustrated in Fig. 2, and has secured obliquely across one face the bar 12 which projects beyond the rear edge of the blade and is provided with a suitable aperture adjacent its rear end to receive the rearmost bolt 9. The projecting portion of this bar 12, which is indicated by the numeral 13, is held against the side of the handle 1 and lies across the forward bolt 10 where it may be retained in position by a suitable nut and washer assembly such as is indicated by the numeral 14 in Fig. 3. This fender is made use of when it is desired to use the implement for the purpose of working the ground down a row of young plants or between such plants and when so used it enables the operator to move the implement along through the earth in close proximity to the plants without danger of having the side of the plow blade 5 engage and cut a plant as the fender blade will act as an effective shield to prevent such damage.

The front or forward portion 4 of the unit 2 is provided at a substantial distance above the plow point 5 with a bolt aperture 15. This is adapted to receive the bolt 16 which is employed for securing to the plow blade a pair of wings such as is shown in Fig. 4, and indicated by the numerals 17 and 18, or a single wing such as is illustrated in Fig. 5. These two wings 17 and 18 when employed together are used to open a furrow in ground which has already been dug up or plowed by the use of the plow blade 5 alone, and as is shown each wing consists of an inner flange portion 19 which has an aperture 20 for the reception of a bolt 16, and one of the wings, preferably the one at the left of the unit, has its flange provided with the edge rib 21 which, when the wing 18 is placed in position directly against the part 4 of the plow unit, abuts one side edge of the unit. In this manner of assembling the wings, the other or outer wing 17 has its flange placed against the forward face of the flange of the wing 18 so that they will be securely held with the flanges in overlapping relation as illustrated.

As is clearly shown in Fig. 4, each of the wings 17 and 18 has a straight bottom edge 22 which lies in the same plane transversely of the part 4 of the unit 2, as the edge of the adjacent wing and each of these bottom edges merges into an upwardly and outwardly inclined edge 23 which joins a vertical outer edge 24 which is parallel with the sides of the frame unit. It will thus be apparent that after the ground has been broken up and the wings or wing blades have been attached and the implement is again drawn thru the loosened earth, there will be formed a relatively deep furrow in which seeds may be planted or fertilizer may be placed. After the seed or the fertilizer has been placed in the furrow, the earth may be easily swept back to fill the furrow by turning the implement upon its side so that the straight edge 24 of one wing blade will lie flat upon the ground and the inclined edge 23 of the same blade will shift the earth removed in forming the furrow back thereinto as the implement is drawn lengthwise in this position.

Where the implement is desired for use as a hoe for removing weeds or other material from between plants, one of the wing blades may be removed and the remaining one secured to the forward portion of the frame unit 2, as illustrated in Fig. 5. After the wing has been secured as illustrated, the implement can be conveniently employed for hoeing purposes by turning it so as to locate the oblique edge 23 upon the ground. This edge will be used for the hoeing operation and as will be readily apparent, when the blade is turned to this position, one side of the point 5 will also be located substantially flat upon the ground surface and may also be employed for hoeing, particularly where heavy weeds or roots may have to be removed. In addition to the edge of the point 5 serving as an auxiliary hoe, it operates to steady the wing when the latter is used for normal hoeing purposes.

Figure 5 illustrates the application of the wing 17 to the plow blade, which wing does not have a rib along the free edge of its flange 19, and in order that this wing may be held against oscillation on the single securing bolt 16, there is provided the washer plate 25 which, as shown in this figure, consists of a rectangular piece of metal having an angular flange along one edge, as indicated at 26. This washer plate is applied to the outer face of the flange 19 of the wing blade 17 after the flange has been placed against the portion 4 of the frame so that the edge flange 26 of the washer plate will lie across the edges of the wing blade flange and body 4 in the manner illustrated in Fig. 7.

From the foregoing it will be readily apparent that the implement herein described embodies several earth-working tools such as the plow, the furrow-opening means, consisting of the pair of wing blades attached to the plow blade, the hoe, which may consist of one wing blade or both wing blades used by turning the implement on its side so that the edge 24 of one blade will engage the ground, or a furrow-filling unit which comprises the angular edge portion of either of the wing blades used in the manner described. In addition the implement may be effectively employed in working around the plants without danger of injuring the same by the employment of the fender or guard device which is shown in Figs. 2 and 3.

What is claimed, is:

1. An implement of the character described, comprising a substantially oval open frame unit of band material having two ends, one of said ends being pointed to form a plow blade, the other end being at the rear of the frame and having a rearwardly extending arm lying in a plane between the point and the top of the frame, a handle secured at one end to said arm with the said end directed toward the adjacent rear face of the frame, and a pair of earth-working wing blades secured to the front of the frame above said point, said blades projecting laterally from the two sides of the frame and each having a bottom edge flush with the bottom edge of the other wing, an upwardly and outwardly inclined lower edge and a vertical outer edge meeting said inclined edge.

2. An implement of the character described, comprising a substantially oval open frame unit of band material having two ends, one of said ends being pointed to form a plow blade, the other end being at the rear of the frame and having a rearwardly extending arm lying in a plane between the point and the top of the frame, a handle secured at one end to said arm with the said end directed toward the adjacent rear face of the frame, and a pair of earth-working wing blades each having a laterally extending flange disposed across the forward side of said frame, said flanges being in overlapping relation, a bolt passing through said flanges and the adjacent portion of said frame, means forming a part of one of said flanges and engaging the adjacent side of the frame for maintaining the flanges and the wing blades against oscillation on said bolt, said blades being disposed to project laterally from the sides of the frame and each having a horizontal bottom edge, an upwardly inclined oblique edge and a vertical outer side edge, the said bottom edges of the blades being in alinement transversely of the frame at a substantial distance above the plow blade.

THOMAS R. BARNETT.